Dec. 28, 1937.  W. H. FRANK ET AL  2,103,325
PANEL BOARD
Filed May 13, 1935  3 Sheets-Sheet 2

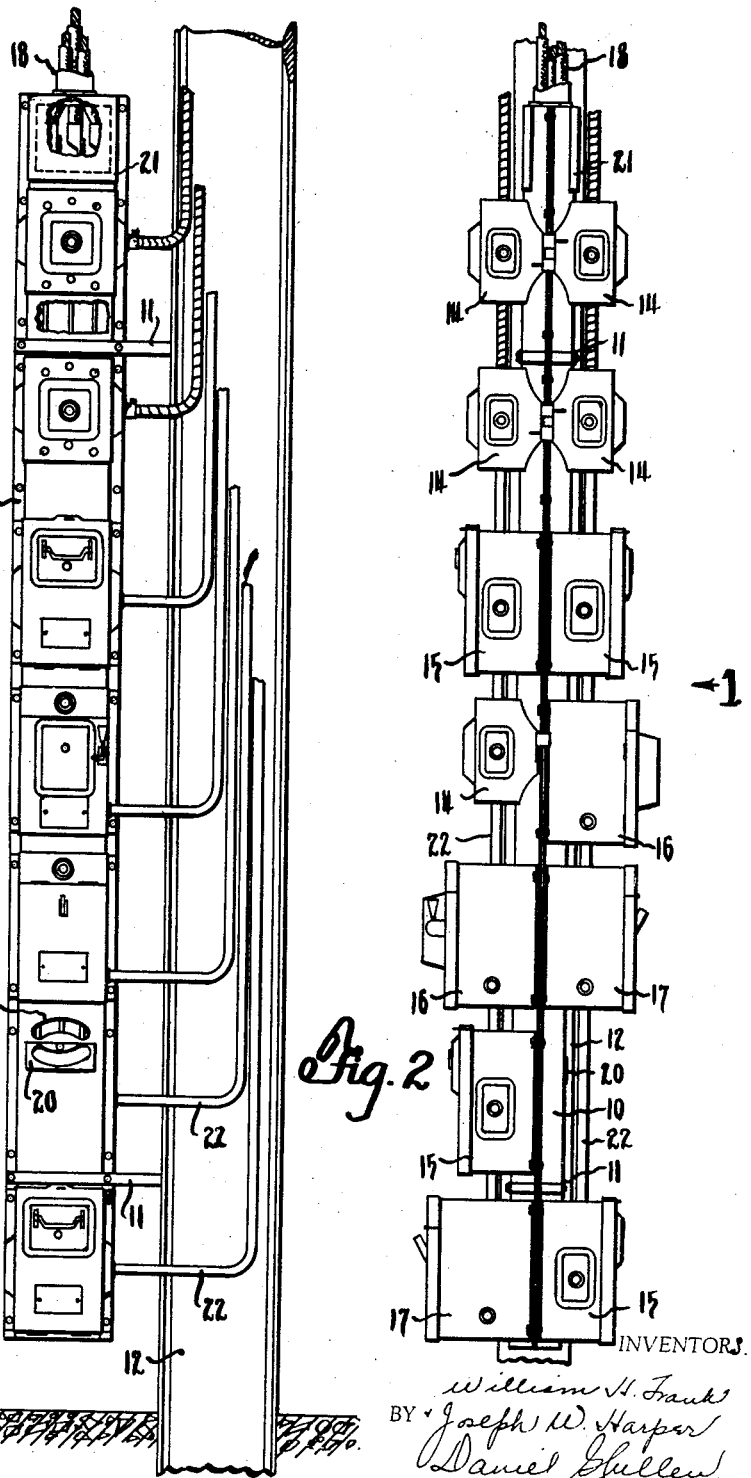

INVENTORS
William H. Frank
BY Joseph W. Harper
Daniel G. Cullen
ATTORNEY.

Dec. 28, 1937.   W. H. FRANK ET AL   2,103,325
PANEL BOARD
Filed May 13, 1935   3 Sheets-Sheet 3

INVENTORS
William H. Frank
BY  Joseph W. Harper
Daniel G. Cullen.
ATTORNEY.

Patented Dec. 28, 1937

2,103,325

UNITED STATES PATENT OFFICE 2,103,325

PANEL BOARD

William H. Frank and Joseph W. Harper, Detroit, Mich.

Application May 13, 1935, Serial No. 21,114

5 Claims. (Cl. 247—3)

This application relates to panelboards and discloses a panelboard which is sectional, dead front, steel-enclosed, neat in appearance, extremely safe, compact and economical to the ultimate degree, completely accessible for manipulation and reconstruction, salvagable in all respects, completely convertible and interchangeable as to voltages, amperages, polarities, and as to types of circuit control units, satisfactory as to circuit rupturing characteristics, readily adaptable for meter testing, useful for emergency disconnecting of circuits, satisfactory insofar as the necessity for providing future circuits is concerned, substantially dust-proof at all times, even during normal circuit control, and which presents a deconcentration of circuit control units without sacrifice of economy of space, and is unattended with difficulties due to the necessity for crowding conductor terminals into wiring gutters.

The panelboard here disclosed may be fabricated by enclosing bus bars in a steel casing or duct and combining therewith steel-enclosed units containing branch circuit control parts and terminals of branch circuit conductors. The control parts or units are interchangeable at will on the steel casing containing the bus bars; each unit is completely independent of its neighbor, and is exposed so that it may be manipulated for switching or disconnecting without its being removed from the bus bar casing and without any part of the interior of the latter being exposed to ambient atmosphere, and each unit may be removed from a bus bar casing without exposing any more than a fragment of the bus bar casing, and that fragment only momentarily during removal and replacement of units.

The panelboard herein disclosed may be considered as a stretched-out distribution run and because of its characteristics it is practical to mount this panelboard in places such as aisles of buildings, near ceilings thereof, or along the floor thereof under machines, etc.

Further, the panelboard herein disclosed is completely flexible for growth and expansion. Sections of bus bar casing may be added at any time with convenience and in a number of different ways, and circuit control units may be appended to these added sections easily and conveniently.

Further, the panelboard herein shown is double-sided, being so formed that units may be combined therewith on either of two opposite sides.

For an understanding of the details of panelboard herein disclosed, reference should be had to the appended drawings.

In these drawings,

Fig. 1 is a view as if from the right of Fig. 2, showing a panelboard mounted on a vertical building column and comprising a single straight run of main bus casing on opposite sides of which are circuit control branch units whose conductors are encompassed within the contour of the column;

Fig. 2 is a view as if from the left of Fig. 1;

Figure 3:
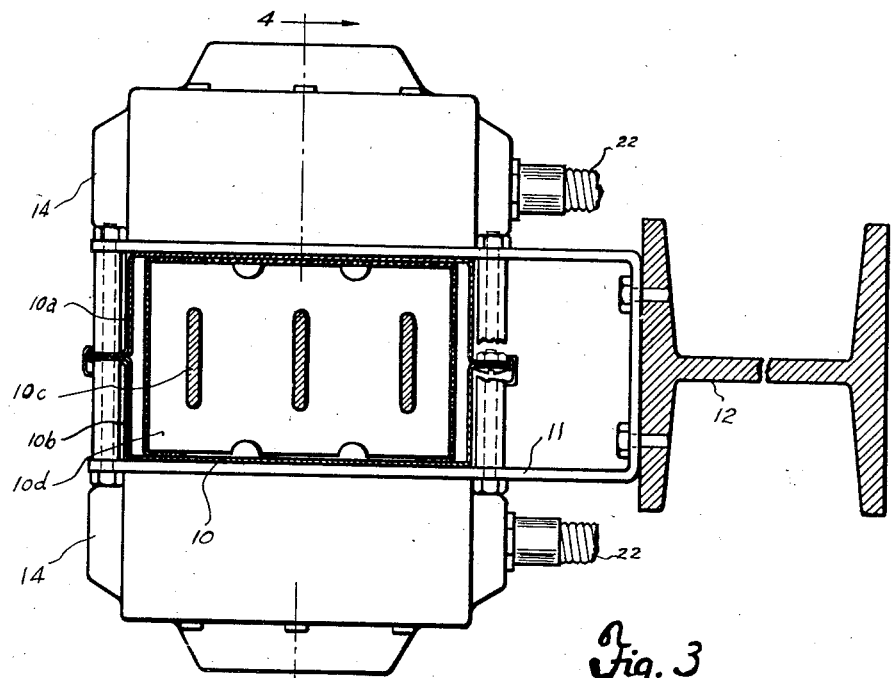
Fig. 3 is a transverse or plan sectional view to a large scale as if taken directly above the upper bracket disclosed in Fig. 1.
Figure 4:
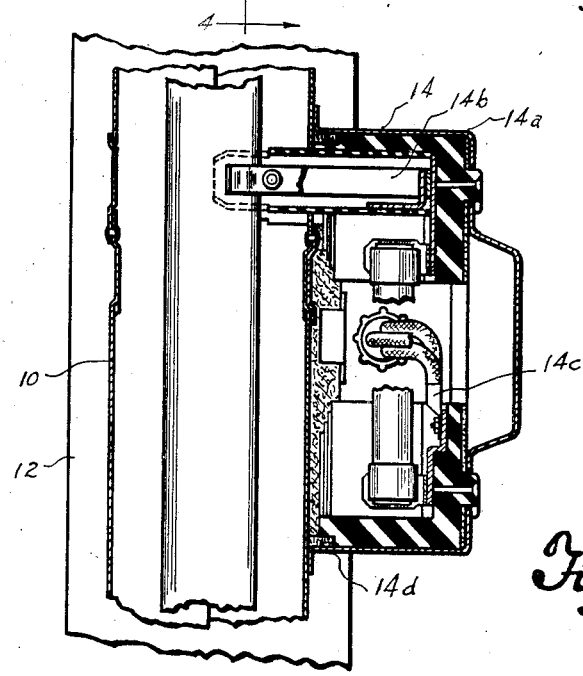
Fig. 4 is a section as if on line 4—4 of Fig. 3.
Figure 5:
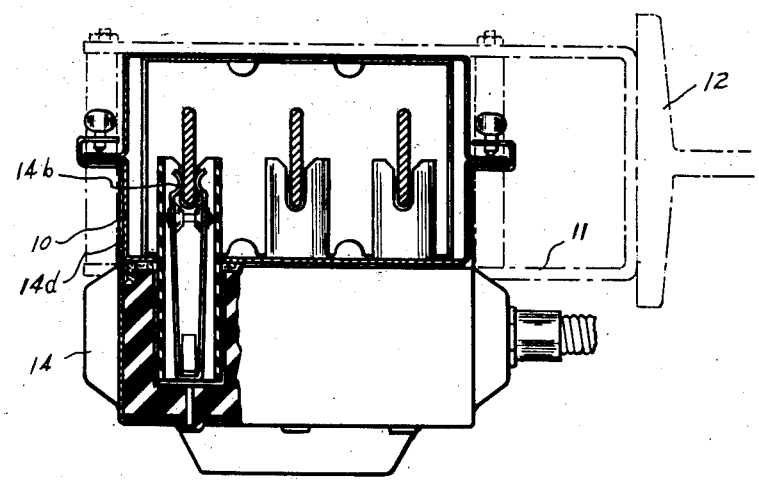
Fig. 5 is another transverse sectional view taken through one of the units.
Figure 6:
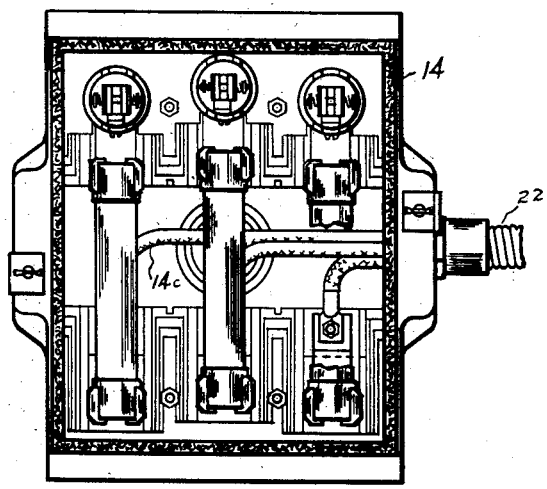
Fig. 6 shows the open face of one of the units.

The drawings disclose a panelboard in the nature of a main casing 10 formed of pans or halves 10a and 10b joined at their flanges to form a duct, and such main casing contains bus bar runs 10c supported on transversely disposed longitudinally spaced insulating partitions 10d. The main casing is mounted by means of brackets 11 on a column 12 in the form of an I beam, and on its opposite sides are branch units 14, 15, 16, and 17 of various types.

The units 14 are of the non-switching fused plug type, the units 15 are of the hinged head, slide block, fused switch type, the units 16 are of the circuit breaker plug type, and the units 17 are of the toggle switch type. Apart from the differences in construction which are such that the units can aptly be described as being of different types, the units contain certain common characteristics. Each unit includes an open-walled steel shell 14a having contact prongs 14b projecting through the open wall thereof and having connection means 14c electrically connected to the prongs in the units through the medium of the fuses in the case of the fused types, through the fused switches in the case of the fused switch types, through circuit breakers in the case of the circuit breaker types, and through the fused toggle switches in the case of the toggle switch types. The side walls of the units are formed with extending portions 14d which embrace the side walls of the main casing 10 and these extensions are formed with ears which engage the flanges of the main casing to provide means whereby the units may be secured to the main casing. The bus bars of the main casing are supplied by main feed conductors 18, and these bus bars are engaged by the contact prongs 14b of the units, these contact prongs entering the main casing through openings or entrance holes 19 on opposite sides thereof, these holes having movable covers 20.

It is observed that the main casing in addition to having the entrance holes 19 and movable covers 20 therefor has large hand holes provided with movable covers 21.

Electrically connected to the connectors 14c of the units are branch circuit conductors which are enclosed in conduits 22 supported on the column 12 which acts as a raceway for these conduits.

It is observed that the open backs of the units provide access to the parts therein contained but are normally closed by the juxtaposition of the units and the main casing.

The panelboard herein disclosed and described, it will be observed, is so constructed that it accomplishes all the objects desired for it, as enumerated in an earlier part of this specification, and inasmuch as the fact of accomplishing these objects by the panelboard herein shown is obvious from an understanding of the details of construction of the panelboard, no further reference to these objects need now be given.

We claim:

1. A panelboard comprising a vertically disposed support, a vertically disposed elongated casing closely adjacent thereto and supported thereby, and a group of closely spaced branch circuit enclosed box-like units removably supported thereon and outside the casing, and disposed on opposite front and back walls thereof, with their long dimensions parallel to the run of the casing, the casing containing naked rigid bus bars insulatedly supported therein with their edges adjacent the front and back walls of the casing, the casing having openings in these front and back walls suitably positioned over the bus bars to provide access to the bus bars from front and back of the casing for contacts plugged onto the bus bars through the openings, the contacts projecting from the backs of the units and engaging flat sides of the bus bars, the contacts being parts of the associated group of branch circuit units, these having identical mounting and plug-in details of construction whereby they may interchangeably cooperate with standard arrangements of bus bars, openings, and unit mounting details of the casing, the associated group of branch circuit units having a variety of branch circuit control means of different types.

2. A panelboard comprising a vertically disposed support, a vertically disposed elongated casing closely adjacent thereto and supported thereby, and a group of closely spaced branch circuit enclosed box-like units removably supported thereon and outside the casing, and disposed on opposite front and back walls thereof, with their long dimensions parallel to the run of the casing, the casing containing naked rigid bus bars insulatedly supported therein with their edges adjacent the front and back flat walls of the casing, the casing having openings in these front and back flat walls suitably positioned over the bus bars to provide access to the bus bars from front and back of the casing for contacts plugged onto the bus bars through the openings, the contacts engaging flat sides of the bus bars, the contacts being parts of the associated group of branch circuit units, these having identical mounting and plug-in details of construction whereby they may interchangeably cooperate with standard arrangements of bus bars, openings, and unit mounting details of the casing, the associated group of branch circuit units having a variety of branch circuit control means of different types, and branch circuit conductors outside and alongside the casing and connected at their ends to the units these having conductor entrances in the sides thereof which are substantially coplanar with the sides of the casing.

3. A panelboard comprising a vertically disposed support, a vertically disposed elongated casing closely adjacent thereto and supported thereby, and containing naked rigid flat bus bars insulatedly supported therein with their edges adjacent opposed front and back walls of the casing, the casing having openings in these walls directly over the bus bar edges, and a group of branch circuit units disposed outside of the casing on these walls and having identical plug contacts insertable into the casing through the openings for engaging flat walls of the bus bars, and having identical mounting details cooperating with standard mounting formations of the casing, the identity of contacts and mounting details providing free interchangeability of units on casings, the group of units having a variety of branch circuit control means of different types, and branch circuit conductors outside the casing and connected at their termini to the units, the connections being within the units and accessible only when the units are removed from the casing.

4. A panelboard comprising a vertically disposed support, a vertically elongated casing closely adjacent thereto and supported thereby, and a group of closely spaced branch circuit enclosed box-like units removably supported thereon and outside the casing, and disposed on opposite front and back walls thereof, with their long dimensions parallel to the run of the casing, the casing containing naked rigid bus bars insulatedly supported therein with their edges adjacent the front and back flat walls of the casing, the casing having openings in these front and back walls suitably positioned over the bus bars to provide access to the bus bars from front and back of the casing for contacts plugged onto the bus bars through the openings, the contacts engaging flat sides of the bus bars, the contacts being parts of the associated group of branch circuit units, these having indentical mounting and plug-in details of construction whereby they may interchangeably cooperate with standard arrangements of bus bars, openings, and unit mounting details of the casing, the associated group of branch circuit units having a variety of branch circuit control means of different types, and branch circuit conductors outside and alongside the casing and connected at their ends to the units, these having conductor entrances in the sides thereof which are substantially coplanar with the sides of the casing, the connections being within the units and accessible only when the units are removed from the casing.

5. A panelboard comprising a vertically disposed support, a vertically elongated casing closely adjacent thereto and supported thereby, and a group of closely spaced branch circuit enclosed box-like units removably supported thereon and outside the casing with their long dimensions parallel to the run of the casing, the casing containing naked rigid bus bars insulatedly supported therein with their edges adjacent the front and back flat walls of the casing, the casing having openings in one of these walls suitably positioned over the bus bars to provide access to the bus bars from outside the casing for contacts plugged onto the bus bars through the openings, the contacts engaging flat sides of the bus bars, the contacts being parts of the associated group of branch circuit units, these having identical mounting and plug-in details of construction whereby they may interchangeably cooperate with standard arrangements of bus bars, openings, and unit mounting details of the casing, the associated group of branch circuit units having a variety of branch circuit control means of different types, and branch circuit conductors outside and alongside the casing and connected at their ends to the units, these having conductor entrances in the sides thereof which are substantially coplanar with the sides of the casing, the connections being within the units and accessible only when the units are removed from the casing.

WILLIAM H. FRANK.
JOSEPH W. HARPER.